United States Patent [19]

Lester et al.

[11] 4,094,685

[45] June 13, 1978

[54] EXPANDABLE POLYMERIC COATING COMPOSITIONS

[75] Inventors: David Lester, Arlington; Robert R. Alexander, Waltham, both of Mass.

[73] Assignee: Polymerics, Inc., Waltham, Mass.

[21] Appl. No.: 708,167

[22] Filed: Jul. 23, 1976

[51] Int. Cl.$^2$ ............................................. C08J 9/14
[52] U.S. Cl. .............................. 260/2.5 B; 260/2.5 L; 260/2.5 HB; 260/2.5 HA
[58] Field of Search ............ 260/2.5 B, 2.5 L, 2.5 HB, 260/2.5 HA

[56] References Cited

U.S. PATENT DOCUMENTS

| 3,004,938 | 10/1961 | Chambers et al. | 260/2.5 L |
| 3,615,972 | 10/1967 | Morehouse | 260/2.5 L |
| 3,920,589 | 11/1975 | Jacobs et al. | 260/2.5 B |
| 4,006,273 | 2/1977 | Wolinski et al. | 260/2.5 B |
| 4,016,110 | 4/1977 | Cohr et al. | 260/2.5 B |

*Primary Examiner*—M. J. Welsh
*Attorney, Agent, or Firm*—James J. Cannon, Jr.

[57] ABSTRACT

An expandable chemical coating compounded by an admixture of a paint, ink or dye with a polymeric composition embodying an encapsulation of a volatile, gas-producing substance which is heat-expandable in a thin polymeric film, said capsules being dispersed in a polymeric composition such that upon application of heat, the encapsulated volatile substance vaporizes to expand and fracture said capsule, thereby trapping the evolving gas in a polymeric medium so that the medium coating is expanded to produce a three-dimensional effect.

26 Claims, No Drawings

EXPANDABLE POLYMERIC COATING COMPOSITIONS

BACKGROUND OF THE INVENTION

1. Field of the Invention

This invention pertains to chemical coatings made from heat-expandable polymeric compositions, and, in particular, to such compositions as used as a component of art materials such as paints. Basic to the invention is the encapsulation in a monomer film forming agent of a volatile liquid or gas to form a polysphere which expands in the presence of heat.

2. Description of the Prior Art

This invention relates to chemical coatings made from expandable polymeric compositions which can be expanded by the introduction of heat at some suitable point in the use of the expandable polymeric compositions. The use in particular, is for art purposes by which these expandable polymeric compositions are painted, brushed, stenciled, coated, printed or sprayed in an artful manner to make or create an art form or craft in many unlimited, extensive forms of art. The final effect is realized when the art is subjected to heat in form of a lighted match, electric or gas fired oven, electric hair dryer, electric iron, steam, hot water, hot oil, or other heat source to cause the art form to expand in the desired manner. This invention in specific relates to the expandable polymeric compositions being added or incorporated into the artist material, of such liquid state, to impart the special feature of "expandable art." The invention also relates to the paints or coatings formed in accordance of this "expandable art" technology.

Expandable art has never been employed in an art form, so hence it is a new art medium that has extremely fascinating appeal for it allows for the creation of new effects. It is possible by incorporating "expandable art" into the normal or conventional paints, coatings and printing inks used by artists, craft masters, and art practitioners to add a new dimension to their works. It is to be understood here that the expandable polymeric compositions of this invention are meant only for art and decorative value, not for any utilitarian function, only for appearance effect by the unique topographic texture achieved.

It is to be further understood that the "expandable art" as provided by the expandable polymeric compositions of this invention combined into a paint, be it oil based or latex based (water system), and the skill of the artist in varying by degree the quantity of the expanding composition or agent employed create "expandable art" effects. Once the artist or practitioner is familiar with the mechanism of expandable art, he can vary to an unlimited degree the amount of expansion desired by the amount of expanding agent used and the kind of heat effect employed. This new art form is very challenging, and this makes it of value, for it requires skill, and work to become proficient in the use of expandable art. The employment of it is not limited, but expansive, and therein lies its appeal and value as a new art medium, or craft tool. Obviously, it would be beyond the ability in specifying this invention to detail in all exactness how it can be used; as with any truly valid art form it is beyond the ability of one man to cite all that can be created. However it is rather our intention to explain how the expandable art is made, and how it can be achieved.

The expansion is achieved by heating, the heat in turn causing the formation of a vapor or a gas that comes from vaporization of an encapsulated liquid, and/or decomposition of a chemical compound. These gas producing chemical compounds are incorporated in a suitable composition that must be especially designed to efficiently disperse and entrap the evolving gas or vapor so that the *whole* composition expands without allowing the gases or vapors to escape beyond the confines of the expanding compositions. To achieve this kind of expanding action effectively, is the very essence of this invention; for liquids that convert from a liquid to a vapor on heating are known phenomena of science, of which water and acetone are known, water being slow and requiring considerable heat to vaporize, whereas acetone is fast, requiring relatively little heat for vaporization; and chemical compounds that decompose on heat yielding as part of their decomposition products gases such as water, nitrogen and carbon dioxide, are also known, these compounds being azo compounds, sulphohydrazides, and nitroso compounds. These vapor producing or gas producing chemical compounds must be adequately dispersed in a specifically designed polymeric composition that encapsulates these gas producing compounds, so that on exposure to heat, the evolving gas does not escape, but is held sufficiently to cause effective expansion of the encapsulating polymeric composition or whatever subsequent polymeric medium, paint coating, or ink, is utilized so that the expandable polymeric composition is dispersed and admixed or incorporated.

To encapsulate the gas-producing chemicals they are formed into what is called "polyspheres". Polyspheres are formed by incorporation of the "seed" emulsion polymerization. These polyspheres assist in holding or entrapping the evolving gas upon the introduction of heat. However, it is still required that these polyspheres be dispersed further in a polymeric film forming composition which in its design furthers the confinement or non-escape of the gas during heat exposure, without first expanding the whole polymeric mass. The expandable polymeric composition does not have to be dried to help trap the gas, but upon immediate exposure to a temperature of sufficient heat to activate the gas-producing agents, the expandable polymeric composition will function while drying, i.e. if it is dried or set at a temperature that activates the expansion, the whole mass will effectively expand without collapse, or escape of gases. Hence, there is no need to be temperature conscious; any temperature of sufficient heat capacity to activate the expanding agents is sufficient. However, if one wishes to dry the expandable art medium, formed by incorporating the expandable polymeric composition, at a temperature below the decomposition temperature or activating temperature of the polyspheres this is perfectly acceptable. The expansion is then accomplished after the expandable art medium is dry, by subjecting it to a temperature sufficient in heat capacity to activate the polyspheres which encapsulate the gas-producing chemicals.

SUMMARY OF THE INVENTION

The expandable chemical coatings made from polymeric compositions of this invention are formed by selecting a *binder polymer latex* that is a film-former, which is normally in the form of a polymeric dispersion (latex) in water. To this is added a dispersing agent to later serve as the dispersant for the polyspheres in the binder dispersion. The term "polysphere" is defined infra in the description of the preferred embodiment.

Three types of polyspheres are specified, polyspheres H, polyspheres BH and polyspheres BHS. Next, the polyspheres are added under adequate agitation to achieve intimate dispersion. A defoamer is added to prevent excessive foam development in handling the compositions and mixing it into other mediums. A bridge solvent is next incorporated into the composition to provide compatibility with mixtures into which the composition will be admixed, and to give wetting upon many diverse surfaces into which the expandable art medium might be applied. "Bridge solvent" is trade terminology for an agent which brings together two phases of a mixture which would not normally come together to form a homogeneous mixture. Next is added the thickener, which increases the viscosity of the composition to the desired level; the thickner also serves to give stability upon admixing with other mediums, give suspending action to the polyspheres in the composition, and to develop or maintain the proper application consisting of the resultant expandable art medium.

DESCRIPTION OF THE PREFERRED EMBODIMENT

The expandable chemical coatings made from polymeric compositions of this invention are formed by selecting a binder polymer latex that is a film-former, which is normally in the form of a polymeric dispersion (latex) in water. In the preferred embodiments and the examples that follow in this specification, the principal binder of the various compositions is acrylic latex and a terpolymer is included to act as a polymeric plasticizer to yield a softer composition. To this is added a dispersing agent to later serve as the dispersant for the polyspheres in the binder dispersion. Next, the polyspheres are added under adequate agitation to achieve intimate dispersion. The term "polysphere" is defined hereinafter. A defoamer is added to prevent excessive foam development in handling the compositions and mixing it into other mediums. A bridge solvent is next incorporated into the composition to provide compatibility with mixtures into which the composition will be admixed, and to give wetting upon many diverse surfaces into which the expandable art medium might be applied. The term "bridge solvent" has been defined above. In the preferred embodiment, the bridge solvent having a low boiling point, not encapsulated in the polyspheres, providing for the wetting of the various ingredients so that a stable, compatible composition is produced. The polyspheres require a bridge solvent to assist in wetting them so that they can be incorporated in the composition binder latex. Next is added the thickener, which increases the viscosity of the composition to the desired level; the thickener also serves to give stability upon admixing with other mediums, give suspending action to the polyspheres in the composition, and to develop or maintain the proper application consisting of the resultant expandable art medium.

The binder polymer latex for the composition can be selected from the following film forming polymers which are:

| | |
|---|---|
| polytheylene | polypropylene |
| polyethylene vinyl acetate | natural rubber |
| 1,4 polyisoprene | polyacrylonitrile |
| polyvinyl fluoride | polyvinylidene chloride |
| polyvinylidene fluoride | polymonochloride |
| fluoroethylene | polytetrafluorethylene |
| polychloroprene | acrylonitrile-butadiene-styrene terpolymer |
| polyvinyl butyral | polystyrene |
| polyvinyl acetate | polyvinyl alcohol |
| poly-a-methyl styrene copolymer | butadiene-styrene polymethacrylate |
| polymethyl-a-cyanoacrylate | ethyl vinyl ether and maleic anhydride |
| polymethyl-vinylether | copolymer of styrene and ethyl acrylate |
| copolymers of styrene and vinylidene chloride | polyvinylidene chloride |
| copolymers of butylacrylate and vinylacetate | copolymers of 2-ethyl nexylacrylate |
| acrylonitrile | copolymer of methyl methacrylate and ethylacrylate |
| copolymers methylmethacrylate & acrylonitrile | terpolymers of acrylinitrile |
| butylacrylate | vinylacetate |
| terpolymers of acrylonitriles | 2-ethylhexylacrylate |
| vinylacetate acrylonitriles | terpolymers of butylacrylate ethylacrylate |
| copolymers of vinylidene chloride | acrylonitrile |
| copolymers of vinylidene chloride & acrylonitrile | copolymers of vinylidene chloride & ethyl acrylate |
| polyurethane | epoxies |
| polycarbonates | polyesters |
| polyamides | urea formaldehyde |
| phenol-formaldehyde | |

These polymers can be self-crosslinking, crosslinkable, or non-curing. These binders can be employed in a mixture, for example copolymer of ethylacrylate, and butylacrylate, and a copolymer of butadiene and acrylonitrile.

The dispersants or dispersing agents are selected from certain types of surface active agents that are particularly effective in dispersing the polyspheres in a water, binder system. The surface-active compounds or agents that have been found effective are benzylphenyldimethyl ammonium salts, nephlanic acid salts, alkylacrylsufonates, sulfamated oils, hydroxylakysulfamide, and hydroxyalkyl phosphates.

The polyspheres as employed in this invention are made from "seed" emulsion polymerization techniques, in which the "seed" consists of the volatile liquid or gas producing solid around which the monomeric film-former polymer components are polymerized to completely encapsulate the "seed" emulsion or dispersion to form the final polyspheres, which consist of volatile liquid or gas-producing solid. An essential requirement for the "seed" emulsion to work, is that the volatile liquids and the gas-producing solids be hydrophobic, so that these hydrophobic compounds must be formed into a fine emulsion or dispersion "seed". This "seed" serves as the site for emulsion polymerization, whereby the monomeric ingredients which are added to the batch or added by delayed addition are polymerized around the "seed" completely encapsulating it.

A typical method of making polyspheres is given: a reactor equipped with an agitator, and exterior high shear turbine pumps is charged first with 100 parts of demineralized water, and 3.5 of an hydroxy alkyl phosphate, followed by 17 parts of a gas producing chemical benzene sulfohydrazide. Next is added 12 parts of a 30% colloidal silica dispersion. To this, is added 0.17 parts of a high hydroxyl ethyl cellulose. Next is added 20 parts of a film forming encapsulating polymer formulated from of a 100 parts premix consisting of 78 parts vinylidene chloride, 4 parts acrylonitrile, and 18 parts of ethyl acrylate. This whole mixture is run through an external high shear turbine pump system, recirculating from the bottom of the reactor to the top for 20 minutes until a fine white emulsion is formed (1.5–20 micron, average 2.0 micron dispersed phase size). After this "seed" dispersion is formed, the initiator, 4 parts of benzoyl peroxide is added, the reactor sealed, and after the reaction is initiated the temperature will rise from the exothermic reaction. As the batch temperature reaches 78° C., the remaining 80 parts of the monomer phase is added slowly, maintaining the reaction at a strong pace at 84° C until all the monomer phase is added. At the completion of the reaction; the resultant reaction mix consist of a milky white liquid. This milky white liquid is a dispersion of polyspheres, consisting of benzene sulfohydrazide encapsulated in a sphere of polyvinylidene, acrylonitrile, ethyl acrylate polymer. The particle size of this dispersion is 2 to 20 microns, the average size 2.5 microns. In this form polyspheres H are employed. If the polysphere dispersion is dried at 146° C for 5 minutes a white, fluffy powder results of expanded spheres, resembling "sea-shells". At this point, the resultant expanded polyspheres are dusty, frayable, crystal-like mass. If polyspheres are to be made using a volatile liquid, like isobutane, which is a vaporizing hydrophobic liquid, then in place of the benzene sulfohydrazide, 20 parts of isobutane is added. This yields polyspheres BH.

By utilizing the above technique a wide variety of expandable microcellular polyspheres can be prepared. Such polyspheres now can find wide usage in the making of expandable art.

In this invention the polyspheres are formulated into art paints, or coatings for textile substrates in the unexpanded form, applied by the coating techniques of painting, brushing, spraying, dipping, and the like by known simple procedures to give designs, lettering, coatings and similar effects, and then by the selective application of heat, activate the expanding action to achieve the final, "raised" or vertical dimensional effect. A further advantage is the ability to work the unexpanded or expanded art application to give special effects resulting from embossing, creasing, or stamping, etc.

The coating and adhesive compositions can be especially formulated by the selective addition of plasticizers, extenders, drying oils, fillers, coloring compounds surfactants, thickeners and the like to make functional, decorative surfaces, such as a "suede" leather effect. The specific combination of the above additives in conjunction with the suitable expanding agent gives the kind of special coating effect desired, either artificial leather or suede.

Hence, it is apparent that by the selective combination of the polyspheres with film formers and various functional additives, compositions can be tailored to many diverse end-uses. The designer familiar with the art of this invention can work with designing the polyspheres to give the expanding effect desired, selecting film-formers to give desired properties, and the many kinds of additives to achieve just the kind of performance intended.

It can be seen that by the practice of this invention in the making of expandable polymeric compositions many decorative are effects can be achieved, therefore examples are given as an illustration only of this vast technology, and in no way should be construed as limiting the scope of this invention.

EXAMPLE NO. 1

An expandable polymeric composition made in accordance with the principles of this invention to make an expanding agent for paints by combining the following ingredients in the indicated proportions:

| Ingredients | Parts By Weight |
| --- | --- |
| Water | 41.73 |
| Hydroxy ethyl cellulose thickener | 0.2 |
| Hydroxy ethyl phosphate | 0.17 |
| Butylene Glycol | 8.7 |
| Terpolymer Latex | 9.2 |
| Polyspheres H | 17.0 |
| Acrylic latex | 23.0 |

This composition can then be combined in any suitable ratio with a commercial artist paint, usually in the ratio of 1 part artist paint to 1 part expanding agent as described above.

The terpolymer latex is made from the emulsion polymerization of the following monomers 30 parts 2-ethyl hexyl acrylate, 30 parts butyl acrylate, and 40 parts of ethyl acrylate, at 50% solids. The term "terpolymer" is a standard term of trade usage used to designate a polymer having three principal ingredients, an acrylic monomer, a vinyl acetate monomer and a vinyl monomer. The formula presented in this example is typical.

The polyspheres are made by reacting 100 parts of demineralized water, containing 15 parts of colloidal silica, 15 parts of benzene sulfohydrazide (Nitropore OBSH from Stepan Chemical, Wilmington, Massachusetts) 2.8 parts of hydroxyl ethyl phosphate, an encapsulating film forming polymer made from 100 parts of vinylidene chloride, 15 parts acrylonitrile, 5 parts of methacrylic acid, 5 parts of ethyl acrylate, and 0.4 parts of benzoly peroxide, identified as Polyspheres H. In this example, the butylene glycol is the bridge solvent, the terpolymer latex is a plasticizer which serves to soften the composition, the acrylic latex is the binder polymer.

The acrylic latex is made by reacting by means of emulsion polymerization the following monomers, 95 parts ethyl acrylate, 2 parts n-methanol acryl amide, 1.0 part acrylic acid, 2 parts acrylonitrile.

The above expanding composition mixes easily into any artist or craft paint, either oil or latex based, in any desired ratio, for example, 1 part expanding agent, 1 part paint or 1 part expanding agent, 2 parts paint; this admixed paint then can be skillfully applied to any particular substrate in any of many manners, allowed to air dry, or not, then subjected to a heat source, set at a minimum temperature of 235° F for at least 180 seconds to achieve a puffing or foaming or expanding action to yield a raised, puffed or three dimensional effect.

EXAMPLE NO. 2

An expandable polymeric composition made in accordance with this invention to make an expanding agent for paints by combining the following ingredients in the indicated proportions:

| Ingredients | Parts by Weight |
| --- | --- |
| Water | 44.88 |
| Hydroxy ethyl cellulose thickener | 0.17 |
| Butylene Glycol | 8.7 |
| Terpolymer Latex | 9.2 |
| Polyspheres BH | 17.0 |
| Acrylic Latex | 23.0 |

Hydroxy ethyl cellulose (Cellosize QP52000H from Union Carbide) Acrylic thickener (Acrysol GS from Rohm & Hass).

Polyspheres BH are made by "seed" emulsion polymerization by reacting 100 parts of demineralized water, 14 parts of colloidal silica, 8 parts of benzene sulfohydrazide (Nitropore OBSH) 8 parts of Isobutane, 1.5 parts hydroxyl ethyl phosphate, 2.5 parts of nonionic surfactant (Igepal CO880 from GAF Chemical Corp.) In this example, the butylene glycol is the bridge solvent, the terpolymer latex is a plasticizer which serves to soften the composition, the acrylic latex is the binder polymer. 100 parts of vinylidene chloride, 15 parts of acrylonitrile, 5 parts of methacrylic acid, 2 parts of ethyl acrylate, and 0.4 parts of benzoyl peroxide catalyst, identified as polysphere BH. The difference between polyspheres H, polyspheres BH and polyspheres BHS is specified in the formulations presented in Example 1, page 11; Example 2, pages 12, 13; and Example 6, page 15. Polyspheres H contain a hydrazine, OBSH, which tends to break down in water. In polyspheres BH isobutane is added as a bridge solvent in a one-to-one ratio to the OBSH to stabilize this water hydrolysis and to assist in binding the colloidal silica. In polyspheres BHS to ratio os isobutane to OBSH is one-to-two, to provide the same stabilization from water hydrolysis while also providing a higher temperature blowing agent.

The above expanding agent is admixed with art or craft paint in any desirable ratio, and expanded by a suitable heat source for 180 seconds at 225° F.

EXAMPLE NO. 3

An expanding polymeric composition for use as a suede paint, or coating:

| Ingredients | Parts by Weight |
| --- | --- |
| Water | 46.0 |
| Hydroxyl ethyl cellulose | 0.15 |
| Acrylic Thickener | 2.0 |
| Precipitated Calcium Carbonate | 12 |
| Terpolymer Latex | 9 |
| Polyspheres BH | 22 |
| Phosphate ester | 4.0 |
| Ammonium Stearate | 2.0 |
| Acrylic Latex | 40.0 |

Acrylic Latex is Rohm & Haas's Rhoplex AC-234. The above composition can be painted or coated by any effective technique to various kinds of substrates such as metal, wood, paper, leather or textile, from a 2 mil to 10 mils thickness, or multiple coats, then exposed to a suitable heat source for 180-240 seconds to achieve expansion to a microporous structure that has the feel or touch of suede.

EXAMPLE NO. 4

An expanding polymeric composition for use as a leather finish, paint or coating.

| Ingredients | Parts by Weight |
| --- | --- |
| Water | 48.42 |
| Hydroxy ethyl phosphate | 0.2 |
| Nonionic Surfactant | 0.4 |
| Bentonite Clay | 12.0 |
| Aluminum Silicate | 12.0 |
| Propylene Clycol | 2.4 |
| Glycol Stearate | 1.3 |
| Terpolymer Latex | 9.0 |
| Polyspheres H | 27.0 |
| Acrylic Latex | 40.0 |
| Acrylic Thickener | 2.0 |
| Hydroxy ethyl cellulose | 0.12 |

The above composition can be coated upon any suitable substrate from a thickness of 2 mils to 20 mils, then exposed to heat for 300 seconds at 240° F. The result is a leather finish having just the right feed and hand. Colorants can be added to this composition either directly, or admised in a polymer vehicle.

Triton X100 from Rohm & Haas.
Volclay Bentonite Bc-USP from American Colloid Company.
Aluminum Silicate-ASP 400 from Minerals & Chemicals Philip Corp.

EXAMPLE NO. 5

An expanding polymeric composition for use as a soft, opaque, backing for rugs, diapers, furniture cloths, and canvas.

| Ingredients | Parts by Weight |
| --- | --- |
| Water | 70.2 |
| Hydroxy ethyl phosphate | 3.0 |
| Kaolin Clay | 30.0 |
| Precipitated Calcium Carbonate | 30.0 |
| Glycol Stearate | 3.0 |
| Butylene Glycol | 9.0 |
| Terpolymer Latex | 11.0 |
| Polyspheres H | 23.0 |
| Styrene-butadiene latex | 43.0 |
| Hydroxy ethyl cellulose | 0.2 |

This composition is back coated on nonwoven or textile substrates by conventional coating techniques and then exposed to heat for 300 seconds at 250° F. The resultant coating is soft, and very opaque, giving unusual softness and opacity.

EXAMPLE NO. 6

An expanding polymeric composition for use as a soft, strong, leather-like coating for shoe uppers.

| Ingredients | Parts by Weight |
| --- | --- |
| Water | 56.2 |
| Hydroxy ethyl phosphate | 3.0 |
| Kaolin Clay | 20.0 |
| Attapulgus clay | 20.0 |
| Butylene Glycol | 3.0 |
| Terpolymer latex | 9.0 |
| Polyspheres BHS | 23.0 |
| Acrylic Latex | 40.0 |
| Hydroxy ethyl cellulose | 0.2 |

Polysphere BHS is made by "seed" emulsion polymerization by reacting 100 parts of demineralized water, 12 parts of colloidal silica, 12 parts of benzene sulfo hydrazide (Nitropore OBSH) 4 parts of isobutane, 1.75 parts of hydroxy ethyl phosphate, 2.3 parts of n-octyl phenol ethylene oxide condensate (Igepal CO 730), 80 parts of vinylidene chloride, 15 parts of butyl acrylate, 5 parts of acrylonitrile, 0.5 parts of methacrylic acid, and 0.6 parts of benzoyl peroxide catalyst, identified as Polyspheres BHS.

The above composition is coated onto canvas fabric at a thickness of 14 mils for the 1st and 2nd coat with a low temperature drying at 200° F after the 1st coat, and a high temperature drying at 280° F for 300 seconds after the 2nd coat. The resultant coating is strong, and attractive, giving a textile surface feel or touch.

EXAMPLE NO. 7

Same as Example No. 6 above, only the acrylic latex is replaced with a vinyl chloride/acrylic latex (Geon 460 X2, B. F. Goodrich). This is applied to canvas fabric as cited under example 6, again given a durable, strong finish on canvas fabric, so as to make attractive canvas shoes.

EXAMPLE NO. 8

An expanding polymeric composition for use as a coating for textile goods.

| Ingredients | Parts by Weight |
| --- | --- |
| Phosphate ester | 30 |
| Di octyl phthalate | 25 |
| Poly oil plasticizer | 25 |
| Geon 121 | 50 |
| Kaolin Clay | 15 |
| Polyspheres H | 15 |
| Mineral Oil | 5 |

This coating composition is applied by conventional coating techniques at 3 to 14 mils in thickness, then exposed to heat at a temperature of 300° F for 360 seconds. This coating is normally embossed while still hot to give an attractive surface pattern.

EXAMPLE NO. 9

An expanding polymeric composition for use as a craft and art paint.

| Ingredients | Parts by Weight |
| --- | --- |
| Water | 36.8 |
| Hydroxy ethyl phosphate | 3.0 |
| Attapulgus Clay | 10.0 |
| Butylene Glycol | 2.5 |
| Glycol Stearate | 1.0 |
| Terpolymer latex | 4.5 |
| Polyspheres BHS | 18.0 |
| Acrylic Latex | 40.0 |
| Defoamer a fatty acid | 0.4 |
| Pigment Color | 4.0 |
| Propylene Glycol | 1.0 |
| Hexanol | 2.0 |
| Hydroxy ethyl cellulose | 0.4 |

This composition is an expandable paint for arts and crafts, that is painted onto paper, wood, metal or fabric substrates, air-dried, then exposed to heat for 180 seconds at 240° F. The resultant effect is a raised, lofty, or three dimensional structure that has a unique texture.

EXAMPLE NO. 10

An expanding polymeric composition for use as texture paint in arts and crafts.

| Ingredients | Parts by Weight |
| --- | --- |
| Water | 57.22 |
| Hydroxy ethyl phosphate | 3.0 |
| Butylene Glycol | 9.0 |
| Wood Flour | 14.0 |
| Terpolymer Latex | 9.0 |
| Polyspheres BHS | 23.0 |
| Acrylic Latex | 40.0 |
| Hydroxy ethyl cellulose | 0.22 |

This composition is painted on any substrate, then air-dried, then exposed to heat for 180 seconds at 240° F to yield a highly textured surface.

The foregoing examples are given to illustrate the nature and operation of this invention, and should not be construed as limiting upon the scope of this invention as defined in the following claims.

We claim:

1. An expandable polymeric coating composition for admixture with paints, dyes and inks to form an expandable chemical coating upon the application of heat comprising:

a first forming binder polymer latex normally in the form of a polymeric dispersion in water to serve as a binder for said composition;

a dispersing agent to serve as a dispersant for expandable volatile substances encapsulated in a monomeric film forming polymer;

a plurality of spheres each of which encapsulates at least one expandable volatile substance in a monomeric film forming polymer dispersed within said first film forming binder polymer latex;

a defoaming agent to prevent excessive foaming when heat is applied to said spheres;

a bridge solvent to provide compatability with the substance into which said polymeric compositions will be mixed and to provide a wetting of said spheres to provide a homogeneous mixture;

a thickener to increase the viscosity of the composition to the desired level, to give stability to mixtures and to give suspending action to said spheres.

2. The expandable polymeric coating composition of claim 1 wherein said film forming binder polymer latex is selected from the following:

| | |
| --- | --- |
| polyethylene | polypropylene |
| polyethylene vinyl acetate | natural rubber |
| 1,4 polyisoprene | polyacrylonitrile |
| polyvinyl fluoride | polyvinylidene chloride |
| polyvinylidene fluoride | polymonochloride |
| fluoroethylene | polytetrafluoroethylene |
| polychloroprene | acrylonitrile-butadiene-styrene terpolymer |
| polyvinyl butyral | polystyrene |
| polyvinyl acetate | polyvinyl alcohol |
| poly-a-methyl styrene copolymer | butadiene-styrene |
| polymethyl-a-cyanoacrylate | polymethacrylate |
| | ethyl vinyl ether and maleic anhydride |
| polymethyl-vinylether | copolymer of styrene and ethyl acrylate |
| copolymers of styrene and vinylidene chloride | polyvinylidene chloride |
| copolymers of butylacrylate and vinylacetate | copolymers of 2-ethyl hexylacrylate |
| acrylonitrile | copolymer of methyl methacrylate and ethylacrylate |
| copolymers methylmethacrylate & acrylonitrile | terpolymers of acrylinitrile |
| butylacrylate | vinylacetate |
| terpolymers of acrylonitriles | 2-ethylhexylacrylate |
| vinylacetate acrylonitriles | terpolymers of butylacrylate ethylacrylate |
| copolymers of vinylidene chloride | acrylonitrile |
| copolymers of vinylidene chloride & acrylonitrile | copolymers of vinylidene chloride & ethyl acrylate |
| polyurethane | epoxies |
| polycarbonates | polyesters |
| polyamides | urea formaldehyde |
| phenol-formaldehyde | |

3. The expandable polymeric coating composition of claim 1 wherein the dispersant is selected from the following group:

benzyl-phenyldimethyl ammonium salts, nephlanic acid salts, alkylacryl-sulfonates, sulfamated oils, hydroxylakysulfamide, and hydroxyalkyl phosphates.

4. The expandable polymeric coating composition of claim 1 wherein said encapsulated substances comprise one or more substances from the following group:

benzene sulfohydrazide
isobutane.

5. The expandable polymeric coating composition of of claim 1 further including a plasticizer in the form of a ter-polymer latex wherein said terpolymer latex comprises:
an emulsion polymerization of the following monomers 30 parts 2-ethyl hexyl acrylate, 30 parts butyl acrylate, and 40 parts of ethyl acrylate, at 50% solids.

6. The expandable polymeric coating composition of claim 1 wherein said spheres are formed by reaction from 100 parts of demineralized water, 15 parts of colloidal silica, 15 parts of benzene sulfohydrazide, 2.8 parts of hydroxy ethyl phosphate, 100 parts of vinylidene chloride, 15 parts of acrylonitrile, 5 parts of methacrylic acid, 5 parts of ethyl acrylate, and 0.4 parts of benzoyl peroxide.

7. The expandable polymeric coating composition of claim 1 wherein said spheres are made by "seed" emulsion polymerization by reacting 100 parts of dimineralized water, 14 parts of colloidal silica, 8 parts of benzene sulfohydrazide, 8 parts of Isobutane, 1.5 parts hydroxyl ethyl phosphate, 2.5 parts of nonionic surfactant, 100 parts of vinylidene chloride, 15 parts of acrylonitrile, 5 parts of methacrylic acid, 2 parts of ethyl acrylate, and 0.4 parts of benzoyl peroxide catalyst.

8. The expandable polymeric coating composition of claim 1 in which said spheres are made by "seed" emulsion polymerization by reacting 100 parts of dimeralized water, 12 parts of colloidal silica, 12 parts of benzene sulfo hydrazide 4 parts of isobutane, 1.75 parts of hydroxy eithyl phosphate, 2.3 parts of n-octyl phenol ethylene oxide condensate, 80 parts of vinylidene chloride, 15 parts of butyl acrylate, 0.4 parts of benzoyl peroxide catalyst.

9. The expandable polymeric composition of claim 5 for admixture with paints wherein said composition includes in parts by weight:

| | |
|---|---|
| spheres | 17.0 |
| water | 41.73 |
| hydroxy ethyl cellulose thickener | 0.2 |
| hydroxy ethyl phosphate | 0.17 |
| butylene glycol | 8.7 |
| terpolymer latex | 9.2 |
| acrylic latex | 23.0 |

10. The expandable polymeric coating composition of claim 9 wherein said acrylic latex is made by reacting by means of emulsion polymerization the following monomers, 95 parts ethyl acrylate, 2 parts n-methanol acryl amide, 1.0 part acrylic acid, 2 parts acrylonitrile.

11. The expandable polymeric coating composition of claim 6 wherein said composition comprises in parts by weight:

| | |
|---|---|
| spheres | 17.0 |
| water | 44.88 |
| hydroxy ethyl cellulose thickener | 0.17 |
| butylene glycol | 8.7 |
| terpolymer latex | 9.2 |
| acrylic latex | 23.0 |

12. The expandable polymeric coating composition of claim 9 further admixed with one to two parts paint and heated for 180 seconds at 225° F.

13. The expandable polymeric coating composition of claim 12 further admixed with a quantity of paint and said coating expanded by a suitable heat source for 180 seconds at 225° F.

14. The expandable polymeric coating composition of claim 1 comprising in parts by weights:

| | |
|---|---|
| spheres | 22.0 |
| water | 46.0 |
| hydroxy ethyl cellulose | 0.15 |
| acrylic thickener | 2.0 |
| precipitated calcium caronate | 12 |
| terpolymer latex | 9 |
| phosphate ester | 4.0 |
| ammonium stearate | 2.0 |
| acrylic latex | 40.0 |

15. The expandable polymeric coating composition of claim 5 comprising in parts by weight:

| | |
|---|---|
| water | 48.42 |
| hydroxy ethyl phosphate | 0.2 |
| nonionic surfactant | 0.4 |
| bentonite clay | 12.0 |
| aluminum silicate | 12.0 |
| propylene glycol | 2.4 |
| glycol stearate | 1.3 |
| terpolymer latex | 9.0 |
| spheres | 27.0 |
| acrylic latex | 40.0 |
| acrylic thickener | 2.0 |
| hydroxy ethyl cellulose | 0.12 |

16. The expandable polymeric coating composition of claim 15 further including said coating exposed to heat for 300 seconds at 240° F.

17. The expandable polymeric coating composition of claim 1 further comprising in parts by weight:

| | |
|---|---|
| water | 70.0 |
| hydroxy ethyl phosphate | 3.0 |
| kaolin caly | 30.0 |
| precipatated calcium carbonate | 30.0 |
| glycol stearate | 3.0 |
| butylene glycol | 9.0 |
| terpolymer latex | 11.0 |
| spheres | 23.0 |
| styrenebutadiene latex | 43.0 |
| hydroxy ethyl cellulose | 0.2 |

18. The expandable polymeric coating composition of claim 17 further including said coating heated for 300 seconds at 250° F.

19. The expandable polymeric coating composition of claim 8 comprising in parts by weight:

| | |
|---|---|
| water | 56.2 |
| hydroxy ethyl phosphate | 3.0 |
| kaolin clay | 20.0 |
| attapulgus clay | 20.0 |
| butylene glycol | 3.0 |
| terpolymer latex | 9.0 |
| spheres | 23.0 |
| acrylic latex | 40.0 |
| hydroxy ethyl cellulose | 0.2 |

20. The expandable polymeric coating composition of claim 19 further including one coat of said composition of 14 mil thickness heated for 300 seconds at 200° F and a second coat of 14 mil thickness heated for 300 seconds at 280° F.

21. The expandable polymeric coating composition of claim 5 for use as a coating for textile goods comprising in parts by weight;

| | |
|---|---|
| phosphate ester | 130 |
| di octyl phthalate | 25 |
| poly oil plasticizer | 25 |
| polyvinyl chloride latex | 50 |
| kaolin clay | 15 |
| spheres | 15 |

| | |
|---|---|
| mineral oil | 5 |

22. The expandable polymeric coating composition of claim 21 further including a coating of 3 to 14 mils in thickness exposed to a temperature of 300° F for 300 seconds.

23. The expandable polymeric coating composition of claim 8 for use as an arts and crafts paint comprising in parts by weight:

| | |
|---|---|
| water | 36.8 |
| hydroxy ethyl phosphate | 3.0 |
| attapulgus clay | 10.0 |
| butylene glycol | 2.5 |
| glycol stearate | 1.0 |
| terpolymer latex | 4.5 |
| spheres | 18.0 |
| acrylic latex | 40.0 |
| defoamer fatty acid | 0.4 |
| pigment color | 4.0 |
| propylene glycol | 1.0 |
| hexanol | 2.0 |
| hydroxy ethyl cellulose | 0.4 |

24. The expandable polymeric coating composition of claim 23 further including coating a substance and heating said coating for 180 seconds at 240° F.

25. The expandable polymeric coating composition of claim 8 for use as a texture paint comprising in parts by weight:

| | |
|---|---|
| water | 57.22 |
| hydroxy ethyl phosphate | 3.0 |
| butylene glycol | 9.0 |
| wood flour | 14.0 |
| terpolymer latex | 9.0 |
| spheres | 23.0 |
| acrylic latex | 40.0 |
| hydroxy ethyl cellulose | 0.22 |

26. The expandable polymeric coating composition of claim 25 further including a coating exposed to heat of 240° F for 180 seconds.

* * * * *